United States Patent
Cho et al.

(10) Patent No.: US 10,029,449 B2
(45) Date of Patent: Jul. 24, 2018

(54) METHOD FOR MANUFACTURING ONE-SIDED THIN POLARIZING PLATE

(71) Applicant: LG CHEM, LTD., Seoul (KR)

(72) Inventors: Hae-Sung Cho, Daejeon (KR);
Sung-Hyun Kim, Daejeon (KR);
Hyun-Hee Son, Daejeon (KR);
Dong-Kyun Ha, Daejeon (KR);
Kwang-Seung Park, Daejeon (KR);
Nam-Jeong Lee, Daejeon (KR);
Jun-Wuk Park, Daejeon (KR);
Tae-Jun Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 118 days.

(21) Appl. No.: 15/024,561

(22) PCT Filed: Aug. 29, 2014

(86) PCT No.: PCT/KR2014/008067
§ 371 (c)(1),
(2) Date: Mar. 24, 2016

(87) PCT Pub. No.: WO2015/046765
PCT Pub. Date: Apr. 2, 2015

(65) Prior Publication Data
US 2016/0229170 A1   Aug. 11, 2016

(30) Foreign Application Priority Data

Sep. 30, 2013   (KR) .................. 10-2013-0117047
Aug. 27, 2014   (KR) .................. 10-2014-0112653

(51) Int. Cl.
*B32B 7/12*   (2006.01)
*B32B 23/08*   (2006.01)
(Continued)

(52) U.S. Cl.
CPC ............. *B32B 38/10* (2013.01); *B32B 7/12* (2013.01); *B32B 23/08* (2013.01); *B32B 27/08* (2013.01);
(Continued)

(58) Field of Classification Search
USPC .................................................. 156/247, 249
See application file for complete search history.

(56) References Cited

U.S. PATENT DOCUMENTS

| 5,302,459 A | 4/1994 | Kim et al. |
| 2008/0011411 A1* | 1/2008 | Fujita .................... B29C 66/939 156/182 |

(Continued)

FOREIGN PATENT DOCUMENTS

| CN | 1754902 A | 4/2006 |
| JP | 2000-338329 A | 12/2000 |

(Continued)

*Primary Examiner* — Sing P Chan
(74) *Attorney, Agent, or Firm* — Dentons US LLP

(57) ABSTRACT

The present invention relates to a method for manufacturing a single-faced thin polarizing plate, including: supplying a process film to one surface of a polarizer having a thickness of 50 μm or less; supplying a protection film to the other surface of the polarizer; forming an adhesive layer by supplying an adhesive composition between the polarizer and the protection film; pressing a laminate of the process film/the polarizer/the protection film by disposing a pair of pressing units on a surface of each of the process film and the protection film; and stripping the process film, in which stripping force between the polarizer and the process film is 1.0 N or less.

13 Claims, 2 Drawing Sheets

(51) Int. Cl.
*B32B 27/08* (2006.01)
*B32B 27/16* (2006.01)
*B32B 27/30* (2006.01)
*B32B 27/32* (2006.01)
*B32B 27/36* (2006.01)
*B32B 37/10* (2006.01)
*B32B 37/26* (2006.01)
*B32B 38/10* (2006.01)
*G02B 1/14* (2015.01)
*G02B 5/30* (2006.01)

(52) U.S. Cl.
CPC ............ *B32B 27/16* (2013.01); *B32B 27/306* (2013.01); *B32B 27/308* (2013.01); *B32B 27/32* (2013.01); *B32B 27/325* (2013.01); *B32B 27/36* (2013.01); *B32B 27/365* (2013.01); *B32B 37/10* (2013.01); *G02B 1/14* (2015.01); *B32B 2037/264* (2013.01); *B32B 2255/10* (2013.01); *B32B 2255/26* (2013.01); *B32B 2307/42* (2013.01); *B32B 2307/514* (2013.01); *B32B 2307/732* (2013.01); *B32B 2310/085* (2013.01); *B32B 2310/0806* (2013.01); *B32B 2310/0825* (2013.01); *B32B 2310/0831* (2013.01); *B32B 2310/0856* (2013.01); *B32B 2310/0862* (2013.01); *B32B 2457/20* (2013.01); *B32B 2571/00* (2013.01); *G02B 5/3033* (2013.01)

(56) References Cited

U.S. PATENT DOCUMENTS

2008/0100780 A1* 5/2008 Suzuki .................. G02B 1/105
349/96
2012/0257129 A1* 10/2012 Seo .................... G02B 27/2214
349/15

FOREIGN PATENT DOCUMENTS

| | | |
|---|---|---|
| JP | 2007-193333 A | 8/2007 |
| JP | 2007-292872 A | 11/2007 |
| JP | 2010-091811 A | 4/2010 |
| JP | 2010-102282 A | 5/2010 |
| JP | 2010-197991 A | 9/2010 |
| JP | 2010-231015 A | 10/2010 |
| JP | 2011-081399 A | 4/2011 |
| JP | 2011-138032 A | 7/2011 |
| JP | 2012-007080 A | 1/2012 |
| JP | 2012-172026 A | 9/2012 |
| JP | 2013-033084 A | 2/2013 |
| JP | 2013-142863 A | 7/2013 |
| JP | 2013-160885 A | 8/2013 |
| KR | 10-2000-0019274 A | 4/2000 |
| WO | 2013/114583 A1 | 8/2013 |
| WO | 2013/114612 A1 | 8/2013 |
| WO | 2015/137250 A1 | 9/2015 |

* cited by examiner

[Figure 1]
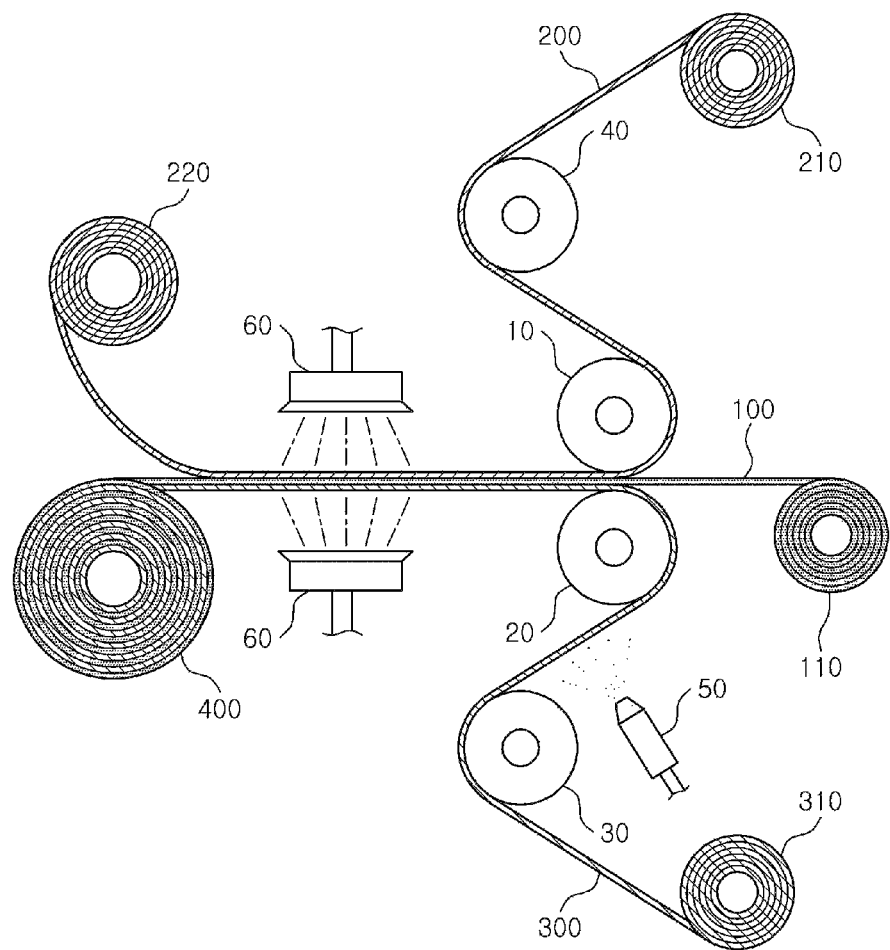

[Figure 2]
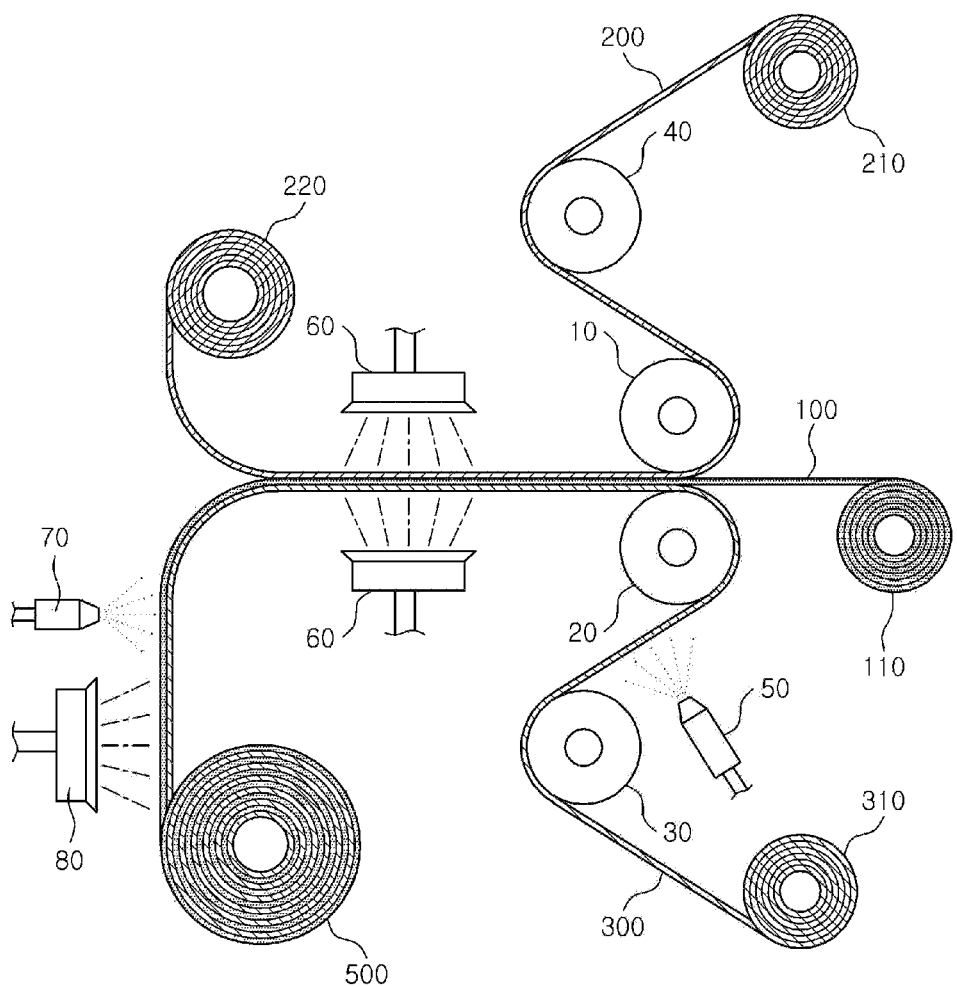

METHOD FOR MANUFACTURING ONE-SIDED THIN POLARIZING PLATE

This application is a National Stage Entry of International Application No. PCT/KR2014/008067, filed on Aug. 29, 2014, and claims the benefit of and priority to Korean Application No. 10-2013-0117047, filed on Sep. 30, 2013, and Korean Application No. 10-2014-0112653, filed on Aug. 27, 2014, all of which are incorporated herein by reference in their entirety for all purposes as if fully set forth herein.

TECHNICAL FIELD

The present invention relates to a method for manufacturing a single-faced thin polarizing plate.

BACKGROUND ART

A polarizing plate is an optical diode for converting natural light or predetermined polarization into polarization in a specific direction, and is extensively used in a display device such as a liquid crystal display and an organic light emitting diode (OLED). The polarizing plate recently used in the display device has been generally used in a structure where a protection film is laminated on both surfaces of a polarizer formed of a polyvinyl alcohol (hereinafter, referred to as 'PVA')-based resin dyed with a dichromatic dye or iodine.

However, in accordance with a recent trend of reducing a thickness of display devices, the polarizing plate also needs to have a reduced thickness. Accordingly, a technology of manufacturing a single-faced polarizing plate where a protection film is attached to only one surface of the polarizer, a technology of forming a polyvinyl alcohol-based film (hereinafter, referred to as 'PVA') having a small thickness of 50 μm or less, which is the polarizer, or the like is proposed.

However, in an existing method for manufacturing a single-faced polarizing plate, in which a protection film is supplied to one surface of the PVA, an adhesive composition is applied therebetween, and pressing is performed by using a pressing roll, it is difficult to manufacture. The reason is that in a process of applying the adhesive composition, in the case where a width of the adhesive composition applied is smaller than a width of a polarizer, a non-attachment surface is formed on the polarizer and a PVA-based film having the non-attachment surface is stripped when post-processing is performed. Accordingly, in order to prevent the problem, the adhesive composition is applied in a width that is more widely than the width of the polarizer, but in this case, the adhesive applied in the width that is more widely than the width of the polarizer contaminates the pressing roll in a pressing process.

Meanwhile, in view of reducing a thickness, it is most preferable to manufacture the single-faced polarizing plate by using the PVA-based film having the small thickness. However, in the case where the existing method for manufacturing the single-faced polarizing plate is directly applied to the thin PVA-based film having the thickness of 50 μm or less, which has low rigidity in a TD direction due to stretching, the single-faced polarizing plate is easily broken due to a difference between moduli applied to both surfaces of the PVA-based film.

Accordingly, there is a demand for developing a technology by which in a process of manufacturing the single-faced polarizing plate, the thin polarizer having the thickness of 50 μm or less can be used, and even though the width of the adhesive composition applied is slightly larger than the width of the polarizer, the occurrence of contamination can be easily and simply prevented in the manufacturing process.

DISCLOSURE

Technical Problem

The present invention has been made in an effort to provide a method for manufacturing a single-faced thin polarizing plate, in which since a thin polarizer having a thickness of 50 μm or less is used, a thickness is significantly small and the occurrence of contamination can be easily prevented in a manufacturing process, and thus workability is excellent and economic feasibility and productivity are high.

Technical Solution

An exemplary embodiment of the present invention provides a method for manufacturing a single-faced thin polarizing plate, including: supplying a process film to one surface of a polarizer having a thickness of 50 μm or less; supplying a protection film to the other surface of the polarizer; forming an adhesive layer by supplying an adhesive composition between the polarizer and the protection film; pressing a laminate of the process film/the polarizer/the protection film by disposing a pair of pressing units on a surface of each of the process film and the protection film; and stripping the process film, in which stripping force between the polarizer and the process film is 1.0 N or less.

Further, the method for manufacturing the single-faced thin polarizing plate of the present invention may further include forming a protection layer on a surface from which the process film is stripped after the stripping of the process film.

Meanwhile, in the method for manufacturing the single-faced thin polarizing plate of the present invention, the adhesive composition may be formed by using a radical-curable composition or a cation-curable composition.

Further, in the method for manufacturing the single-faced thin polarizing plate of the present invention, the protection layer may be formed by using a radical-curable composition or a cation-curable composition.

In this case, a modulus of the protection layer may be 500 MPa to 6000 MPa, and a thickness may be 0.5 μm to 10 μm.

Meanwhile, a thickness of the process film may be 20 μm to 100 μm, and a width of the process film may be larger than a width of the polarizer. Further, surface roughness (Ra) of the process film may be 0.5 nm to 60 nm.

Meanwhile, it is preferable that a thickness of the polarizer after stretching be 50 μm or less, the stretching may be wet stretching or dry stretching, and a stretching magnification may be 4 times or more.

Further, a thickness of the single-faced thin polarizing plate manufactured according to the present invention may be 30 μm to 140 μm.

Advantageous Effects

According to a manufacturing method of the present invention, it is possible to manufacture a thin polarizing plate having a significantly small thickness by using a thin polarizer having a thickness of 50 μm or less, and to easily prevent occurrence of contamination in a manufacturing process, and thus workability in the process is excellent.

Further, in the case where the method for manufacturing the single-faced thin polarizing plate according to the present invention is used, since the method can be performed in a continuous process using a roll to roll process, production yield is high and the method is very economical.

DESCRIPTION OF DRAWINGS

FIG. 1 schematically illustrates an exemplary embodiment of a method for manufacturing a single-faced thin polarizing plate according to the present invention.

FIG. 2 schematically illustrates another exemplary embodiment of a method for manufacturing a single-faced thin polarizing plate according to the present invention.

MODE FOR INVENTION

Preferred exemplary embodiments of the present invention will be hereinafter described with reference to the accompanying drawings. However, the exemplary embodiments of the present invention may be modified into various other forms and the scope of the present invention is not limited to exemplary embodiments as will be described below. Further, the exemplary embodiments of the present invention are provided so that those skilled in the art may more completely understand the present invention. The shape, the size, etc., of elements in the figures may be exaggerated for explicit comprehension.

The inventors of the present invention have repeatedly studied to develop a method for manufacturing a single-faced thin polarizer capable of reducing an occurrence ratio of breakage of a polarizer and preventing occurrence of contamination in a roll in a pressing process, and found that the aforementioned objects can be achieved by supplying a process film to an upper portion of a surface of the polarizer, to which a protection film is not attached, and then performing the pressing process, thereby accomplishing the present invention.

To be more specific, a method for manufacturing a single-faced thin polarizing plate according to the present invention includes supplying a process film to one surface of a polarizer having a thickness of 50 μm or less; supplying a protection film to the other surface of the polarizer; forming an adhesive layer by supplying an adhesive composition between the polarizer and the protection film; pressing a laminate of the process film/the polarizer/the protection film by disposing a pair of pressing units on surfaces of the process film and the protection film, respectively; and stripping the process film, and stripping force between the polarizer and the process film is 1.0 N or less.

That is, the method for manufacturing the single-faced thin polarizing plate according to the present invention may include a film supply process, a pressing process, and a stripping process. Hereinafter, an exemplary embodiment of the method for manufacturing the single-faced thin polarizing plate according to the present invention will be described with reference to FIG. 1. FIG. 1 is a schematic cross-sectional view illustrating the method for manufacturing the single-faced thin polarizing plate according to the present invention.

In the method for manufacturing the single-faced thin polarizing plate according to the present invention, the film supply process includes a step of supplying the process film to one surface of the polarizer having a thickness of 50 μm or less and a step of supplying the protection film to the other surface of the polarizer. To be more specific, for example, as illustrated in FIG. 1, the film supply process may be performed by a method where a process film 200 is supplied to one surface of a polarizer 100 formed of a polyvinyl alcohol-based resin film having a thickness of 50 μm or less and, simultaneously a protection film 300 is supplied to the other surface of the polarizer.

Herein, a method for supplying the polarizer 100, the process film 200, and the protection film 300 may be performed by using a method well known in the art. For example, as illustrated in FIG. 1, the polarizer 100, the process film 200, and the protection film 300 may be supplied while being wound around rolls 110, 210, and 310, respectively but are not limited thereto.

Particularly, in the method for manufacturing the single-faced thin polarizing plate according to the present invention, when the process film 200 is used as described above, a pressure applied by a pressing unit can be absorbed by the process film 200 to relieve stress applied to the polarizer and thus effectively reduce breakage.

Further, as described above, in the related art, since a pressing unit is positioned directly on an upper surface of the polarizer, an adhesive contaminates the pressing unit, that is, the roll in the pressing process. However, in the method for manufacturing the thin polarizing plate according to the present invention, since the process film 200 exists on the upper portion of the polarizer, contamination of the pressing unit due to the adhesive used when the protection film 300 and the polarizer 100 are bonded is relatively infrequent.

Meanwhile, a supply speed of each film may be determined as an appropriate value for a manufacturing process to supply the film, and is not particularly limited, but for example, supplying the film at the speed of 3 M/min to 50 M/min is advantageous for stable adhesion.

Further, supply directions of the polarizer 100, the process film 200, and the protection film 300, as illustrated in FIG. 1, may be diagonal directions, but are not limited thereto. Accordingly, a portion of the polarizer 100, the process film 200, and the protection film 300 may be vertically supplied or supplied in parallel.

Herein, as the polarizer 100, a polarizer having a thickness of 50 μm or less may be used, and the thickness of the polarizer means a thickness after stretching. That is, in the present invention, the thickness of the polarizer after stretching is preferably 50 μm or less and more preferably 4 μm to 30 μm or 4 μm to 25 μm. This is because in the case where the thickness of the polarizer after stretching satisfies the aforementioned numerical value, it is easy to manufacture the single-faced thin polarizing plate having the smaller thickness.

Meanwhile, as the polarizer 100, the polyvinyl alcohol-based resin film where molecular chains containing an iodine-based compound or a dichromatic dye are aligned in a predetermined direction is generally used. The polarizer 100 may be manufactured by a method where iodine or the dichromatic dye is dyed on the polyvinyl alcohol-based resin film, followed by stretching in a predetermined direction and cross-linking. In this case, the stretching process may be performed by wet stretching performed in a solution such as a boric acid aqueous solution or an iodine aqueous solution, dry stretching performed in the air, or the like, it is preferable that a stretching magnification be 4 times or more and more specifically 4 times to 15 times or 4 times to 13 times, and it is preferable that a stretching direction be a length direction (machine direction, MD direction) of the polyvinyl alcohol-based resin film. Further, the degree of polymerization of polyvinyl alcohol is not particularly limited, but in consideration of unrestrictedness of movement of molecules and smooth mixing with containing materials, the degree of polymerization may be preferably about 1,000 to 10,000 and more preferably about 1,500 to 5,000. In the present invention, as the polarizer 100, goods on the market may be used, and for example, products manufactured by KURARAY CO., LTD., Nippon Gohsei Co., Ltd., or the like may be used.

Further, in the present invention, a film that may be used as the process film 200 is not particularly limited as long as stripping force between the polarizer 100 and the process film 200 is 1.0 N or less. Generally, since adhesion force between the polarizer and a base substance is at a level of about 1.01 N to 4 N, in the case where stripping force between the polarizer and the process film is more than 1.0 N, the process film may not be easily stripped or the polarizer may be damaged in a stripping process as will be described later.

In the present specification, stripping force between the polarizer and the process film means a value measured by a method for performing 90° stripping at a speed of 300 m/min by using the single-faced polarizing plate having a width of 20 mm and a length of 100 mm. In this case, a stripped surface may be an interface between the process film and the PVA-based film or an interface between the process film and the adhesive layer.

Meanwhile, specific examples of the process film 200 may include one kind or more selected from the group consisting of a polyethylene terephthalate film, a polyethylene film, a polycarbonate film, a triacetylcellulose film, a cycloolefin polymer film, and an acryl film, but are not limited thereto. In this case, in the case where the base substance having high adhesion force with the PVA-based film, such as the acryl film, is used as the process film 200, in order to satisfy a condition of stripping force between the polarizer 100 and the process film 200, separate surface treatment may be performed.

The surface treatment may be performed by a method well known in the art, but for example, may be performed by a method such as silicon coating.

Meanwhile, the thickness of the process film 200 is not particularly limited, but for example, the thickness is preferably 20 μm to 100 μm or 25 μm to 75 μm in terms of running stability. In the case where the thickness of the process film satisfies the aforementioned numerical range, generation of wrinkles by expansion and/or shrinkage of the film due to heat generated when UV curing is performed may be prevented, and when UV curing is performed, ultraviolet rays may well reach the adhesive layer to solve a problem of generation of an uncured portion.

Moreover, in the present invention, it is preferable that a width of the process film 200 be larger than a width of the polarizer 100. In the case where the width of the process film 200 is larger than the width of the polarizer 100, contamination of the pressing unit by the adhesive may be more effectively reduced.

Further, it is preferable that surface roughness Ra of the process film 200 be, for example, 0.5 nm to 60 nm, 1 nm to 55 nm, or 2 nm to 50 nm.

Herein, the surface roughness means a size of a minute uneven form formed on the surface of the process film. In the present invention, since the process film has the minute surface uneven form having the aforementioned size over the entire surface of thereof, a surface area thereof is significantly increased, and thus even though a separate adhesive layer and the like are not formed, adhesion with the polarizer is effectively performed. Particularly, in the present invention, in the case where the process film having a surface roughness value in the aforementioned range is used, since an orange peeling phenomenon where unevenness is formed on the surface of the polarizer to make the surface rough may be prevented from occurring, the process film is very advantageous.

Meanwhile, in the method for manufacturing the single-faced thin polarizing plate according to the present invention, the protection film 300 is not particularly limited as long as the protection film is a transparent base substance film. More specific examples of the protection film may include one kind or more selected from the group consisting of a polyethylene terephthalate film, a polyethylene film, a polycarbonate film, a triacetylcellulose film, a cycloolefin polymer film, an acryl film, and the like, but are not limited thereto.

Next, the film supply process includes a step of forming an adhesive layer by supplying an adhesive composition between the polarizer 100 and the protection film 300.

Herein, the step of forming the adhesive layer may be performed in a predetermined step of the film supply process by a method where the adhesive composition is applied on at least one side of a binding surface of the polarizer 100 and a binding surface of the protection film 300. In FIG. 1, the adhesive composition is applied on the binding surface of the protection film 300 by using an adhesive application device 50, but the surface on which the adhesive composition is applied is not limited thereto. For example, the adhesive composition may be applied on the binding surface of the polarizer 100 rather than the protection film 300.

In this case, the adhesion surface of the protection film 300, on which the adhesive composition is applied, may be subjected to surface activation treatment such as corona treatment, plasma treatment, UV irradiation treatment, or electron beam irradiation treatment before the adhesive composition is applied.

In the present invention, the adhesive composition is configured to bond the polarizer 100 and the protection film 300, and the adhesive composition is not particularly limited as long as the adhesive composition is cured by irradiation of an active energy ray. More specific examples thereof may include a cation-curable composition including a glycidyl ether-based epoxy compound, an alicyclic epoxy compound and/or an oxetane compound, and the like, or a radical-curable composition including an acryl-based compound and the like.

Further, the method for applying the adhesive composition is not particularly limited as long as a required amount of the adhesive composition can be uniformly applied by the method. To be more specific, for example, the application may be performed by using various kinds of coating methods such as doctor blade, a wire bar, die coating, comma coating, and gravure coating, but is not limited thereto.

Meanwhile, the adhesive layer formed as described above, as illustrated in FIG. 1, may be cured by irradiating an active energy ray by using an active energy ray irradiation unit 60. In this case, as the active energy ray, particle beams such as alpha-particle beams, proton beams, and neutron beams, as well as ultraviolet rays, electronic beams, microwaves, infrared rays (IR), X-rays, and gamma rays may be included, and generally, the ultraviolet rays, the electronic beams, or the like may be used.

In this case, the intensity of irradiation of the active energy ray irradiated on the adhesive layer may be 500 mJ/cm$^2$ to 3000 mJ/cm$^2$, and an irradiation time may be 0.1 s to 20 s. In the case where the intensity of irradiation and the irradiation time of the active energy ray satisfy the aforementioned numerical ranges, a curing speed of the adhesive is high, an appearance property and an optical property of the film are not degraded, and thus productivity is excellent. Further, in the case of an irradiation direction of the active energy ray, irradiation may be performed on the surface of the process film 200 or on the surface of the protection film 300 on which the adhesive layer is formed, and as illustrated in FIG. 1, irradiation may be performed on both surfaces thereof.

It is preferable that the thickness of the adhesive layer cured as described above be 0.1 μm to 10 μm, 0.3 μm to 5 μm, or 0.5 μm to 4.0 μm in terms of processability. That is, in the case where the thickness of the adhesive layer is 0.1 μm or more, a coating property is excellent, and in the case where the thickness is 10 μm or less, the adhesive layer may have excellent durability.

Next, the pressing process may include a step of pressing a laminate of the process film 200/the polarizer 100/the protection film 300 by disposing a pair of pressing units on surfaces of the process film 200 and the protection film 300, respectively. To be more specific, for example, as illustrated in FIG. 1, pressing may be performed by a method for performing pressing by using a pair of pressing units between which the laminate having the structure of the process film 200/the polarizer 100/the protection film 100 is interposed. In this case, the pressing unit is not particularly limited, but for example, a binding machine such as a laminate of roll types 10 and 20 may be used.

In this case, the pressing step may be, for example, performed under a pressure of 0.5 MPa to 6 MPa or 1 MPa to 5 MPa. In the case where the laminate of the process film 200/the polarizer 100/the protection film 300 is pressed by the aforementioned pressure, a stable running property may be ensured without damaging the polarizer and bubbles flowing thereinto when the films are bonded may be effectively removed.

Next, the stripping process may include a step of stripping the process film 200, and for example, as illustrated in FIG. 1, stripping may be performed by a method where the process film 200 is stripped to wind the stripped process film 200 around a process film winding roll 220 and simultaneously wind the formed single-faced thin polarizing plate around a polarizing plate winding roll 400.

In the method for manufacturing the single-faced thin polarizing plate according to the present invention, since the film supply process, the pressing process, and the stripping process can be simultaneously performed in a continuous process using a roll to roll process, production yield is high and the method is very economical.

If necessary, the manufacturing method of the present invention may further include, as illustrated in FIG. 2, a step of forming a protection layer on the surface from which the process film 200 is stripped after the step of stripping the process film 200. If the aforementioned protection layer is formed, the polarizer 100 even in a wetproof environment can be prevented from being discolored, and shrinkage stress of the polarizer in a thermal shock environment can be protected by the protection layer to prevent occurrence of cracks in the polarizing plate, and thus excellent water resistance and thermal shock property with respect to the single-faced thin polarizing plate according to the present invention can be ensured.

Herein, the step of forming the protection layer may be performed by a method where the composition for forming the protection layer is applied on one surface of the polarizer 100 and then dried and/or cured. For example, as illustrated in FIG. 2, the protection layer may be formed by a method where the composition for forming the protection layer is applied by using an application unit 70 and then cured by using a curing unit 80.

The application unit 70 applying the composition for forming the protection layer is not particularly limited as long as the application unit can uniformly apply the composition for forming the protection layer in a required amount. To be more specific, for example, the application may be performed by using various kinds of coating methods such as doctor blade, a wire bar, die coating, comma coating, and gravure coating, but is not limited thereto.

Further, the protection layer formed as described above, as illustrated in FIG. 2, may be cured by irradiating the active energy ray by using the active energy ray irradiation unit 80. In this case, a kind, the intensity of irradiation, an irradiation time, and an irradiation direction of the active energy ray are the same as those described in the step of forming the adhesive layer.

Meanwhile, the thickness of the protection layer cured by the aforementioned method may be, for example, 0.5 μm to 10 μm or 0.5 μm to 7 μm. In order to ensure the thermal shock property of the thin polarizing plate according to the present invention by preventing occurrence of cracks in the polarizing plate in the thermal shock environment, moduli of the protection film and the protection layer need to be designed to be larger than shrinkage stress of the polarizer. In this case, the modulus of the protection layer depends on the thickness of the protection layer, and in the case where the thickness of the protection layer satisfies the aforementioned numerical range, the sizes of the moduli of the protection film and the protection layer are larger than shrinkage stress of the polarizer and thus it is easy to ensure the thermal shock property of the polarizing plate.

In the present invention, the composition for forming the protection layer is not particularly limited, but in consideration of process convenience, it is preferable that the composition be a composition cured by irradiation of the active energy ray. More specific examples of the composition for forming the protection layer may include a cation-curable composition including a glycidyl ether-based epoxy compound, an alicyclic epoxy compound and/or an oxetane compound, and the like, or a radical-curable composition including an acryl-based compound and the like.

Meanwhile, the modulus of the protection layer may be, for example, 500 MPa to 6000 MPa, 1000 MPa to 5500 MPa, or 1500 MPa to 5000 MPa at 70° C. This is because in the present invention, in the case where the modulus of the protection layer has the aforementioned value, heat resistance and the thermal shock property of the polarizing plate may be ensured.

Herein, the modulus is an index exhibiting an elastic property of a predetermined material, and is defined by a proportional coefficient between stress and a deformation rate with respect to a predetermined space position and time in the material. That is, in the case of simple tension, when stress is σ, the deformation rate is ε, and the modulus is E, σ may be defined by Eε. Further, in the present specification, the modulus is a value obtained by measuring a change in frequency response according to stress applied by using DMA (dynamic mechanical analyzer) equipment manufactured by TA Instrument Inc.

Further, a glass transition temperature (Tg) of the protection layer may be, for example, 70° C. to 300° C.

Meanwhile, by the aforementioned method, the single-faced thin polarizing plate where the protection layer is formed may be, as illustrated in FIG. 2, wound around a polarizing plate winding roll 500 to be manufactured in a roll form.

The thickness of the single-faced thin polarizing plate manufactured according to the present invention may be, for example, 30 μm to 140 μm, 30 μm to 130 μm, or 30 μm to 120 μm.

As described above, in the case where the method for manufacturing the single-faced thin polarizing plate according to the present invention is used, the thin polarizer having the thickness of 50 μm or less may be used to manufacture the thin polarizing plate having the significantly small thickness and easily prevent occurrence of contamination in the manufacturing process, and thus workability is excellent. Further, since the method can be performed in a continuous process using a roll to roll process, production yield is high and the method is very economical.

EXAMPLE 1

While the polyvinyl alcohol-based film (products manufactured by Nippon Gohsei Co., Ltd.) having the thickness of 20 μm was moved under the atmosphere of 25° C. at the speed of 10 M/min in the horizontal direction, the PET film (products manufactured by TSI Inc.) having the thickness of 38 μm, stripping force of 0.2 N or less with the polarizer, and surface roughness Ra of 27 nm was supplied as the process film to the upper surface thereof, and the acryl film (products manufactured by Nippon Catalyst PTE Ltd.) was supplied as the protection film to the lower surface of the PET film to pass a pair of rolls at the speed of 10 M/min and under the pressure of 2 MPa. In this case, the UV-curable adhesive composition was applied in the thickness of 2 μm between the polyvinyl alcohol-based film and the protection film by using the Mayer Bar. Thereafter, after the ultraviolet rays of 500 mJ/cm$^2$ were irradiated by using the Arc lamp to perform curing, the process film was stripped to manufacture the single-faced thin polarizing plate where the acryl film was attached as the protection film to only one surface of the polyvinyl alcohol-based film.

EXAMPLE 2

The single-faced thin polarizing plate was manufactured by the same method as Example 1, except that after the protection film was stripped, the same composition as the UV-curable adhesive composition was applied on the surface from which the protection film was stripped and cured under the same condition to further form the protection layer.

COMPARATIVE EXAMPLE 1

While the polyvinyl alcohol-based film (products manufactured by Nippon Gohsei Co., Ltd.) having the thickness of 20 μm was moved under the atmosphere of 25° C. at the speed of 10 M/min in the horizontal direction, the acryl film (products manufactured by Nippon Catalyst PTE Ltd.) was supplied as the protection film to one surface thereof to pass a pair of rolls at the speed of 10 M/min and under the pressure of 2 MPa. In this case, the UV-curable adhesive composition was applied in the thickness of 2 μm between the polyvinyl alcohol-based film and the protection film by using the Mayer Bar. Thereafter, after the ultraviolet rays of 500 mJ/cm$^2$ were irradiated by using the Arc lamp to perform curing, the single-faced thin polarizing plate where the acryl film was attached as the protection film to only one surface of the polyvinyl alcohol-based film was manufactured.

COMPARATIVE EXAMPLE 2

The single-faced thin polarizing plate was manufactured by the same method as Example 1, except that the PET film having stripping force of 3 N with the polarizer was used as the process film.

COMPARATIVE EXAMPLE 3

The single-faced thin polarizing plate was manufactured by the same method as Example 1, except that the PET film having surface roughness Ra of 65 nm was used as the process film.

EXPERIMENTAL EXAMPLE 1

Contamination or Non-contamination of Roll

With respect to the single-faced thin polarizing plates manufactured by Examples 1 to 2 and Comparative Examples 1 to 3, whether the roll was contaminated or not in the manufacturing process was measured. Measurement was performed by the method for confirming the degree of contamination of the region of the roll, through which both ends of the film pass, pressing the other surface of the surface to which the protection film was attached by the naked eyes. The results are described in the following Table 1. In the case where there is no contaminated portion, the case is represented by x, and in the case where there is the contaminated portion, the case is represented by ○.

EXPERIMENTAL EXAMPLE 2

Breakage or Non-breakage of Polarizer

With respect to the single-faced thin polarizing plates manufactured by Examples 1 to 2 and Comparative Examples 1 to 3, whether the polarizer was broken or not in the manufacturing process was measured. Measurement was performed by the method for confirming whether the polarizer was broken or not in the process of running to the polarizing plate winding rolls 400 and 500 after curing by the ultraviolet rays by the naked eyes. The results are described in the following Table 1. In the case where the polarizer was not broken, the case is represented by x, and in the case where the polarizer is broken, the case is represented by ○.

EXPERIMENTAL EXAMPLE 3

Evaluation of Appearance of Polarizing Plate

Whether the orange peel phenomenon occurred or not in the polarizer was measured by the naked eyes by using the single-faced thin polarizing plates manufactured by Examples 1 and 2 and Comparative Examples 1 to 3. In the case where the orange peel phenomenon where unevenness is formed on the surface of the polarizer to make the surface rough does not occur, the case is represented by x, and in the case where the orange peel phenomenon occurs, the case is represented by ○, and the results are described in the following Table 1.

TABLE 1

| Classification | Contamination or non-contamination of roll | Breakage or non-breakage of polarizer | Appearance Evaluation |
|---|---|---|---|
| Example 1 | x | x | x |
| Example 2 | x | x | x |
| Comparative Example 1 | o | o | x |
| Comparative Example 2 | x | o | x |
| Comparative Example 3 | x | x | o |

As described in Table 1, it can be seen that in the case of the single-faced thin polarizing plates of Example 1 manufactured by using the process film and Example 2 in which the protection layer is formed after the process film is removed, the roll is not contaminated and the polarizer is not broken in the manufacturing process, and the polarizer having the excellent appearance can be easily manufactured without occurrence of the orange peel phenomenon.

On the other hand, in the case of Comparative Example 1 in which the thin polarizing plate was manufactured without using the process film, the roll was contaminated and the polarizer was broken in the manufacturing process. Further, in the case of Comparative Example 2 in which the process film was used but stripping force between the polarizer and the process film was larger than 1.0 N, the polarizer was broken in the process of stripping the process film, and in the case of Comparative Example 3 in which the polarizing plate was manufactured by using the process film having surface roughness deviating from the numerical range of the present invention, the orange peel phenomenon occurred in the polarizer to significantly reduce the appearance property.

Although the exemplary embodiments of the present application are described in detail, the scope of the present invention is not limited to the exemplary embodiments, and it will be apparent to those skilled in the art that various modifications and changes may be made thereto without departing from the spirit of the present invention described in the claims.

DESCRIPTION OF REFERENCE NUMERALS 10, 20: Pressing roll
30, 40: Running roll
50: Adhesive composition application unit
60, 80: Active energy ray irradiation unit
70: Composition application unit for forming protection layer
100: Polarizer
110: Polarizer roll
200: Process film
210: Process film roll
220: Stripped process film winding roll
300: Protection film
310: Protection film roll
400: Single-faced thin polarizing plate winding roll
500: Single-faced thin polarizing plate winding roll where protection layer is formed

The invention claimed is:

1. A method for manufacturing a single-faced thin polarizing plate, comprising:

supplying a process film to one surface of a polarizer having a thickness of 50 µm or less;

supplying a protection film to the other surface of the polarizer;

forming an adhesive layer by supplying an adhesive composition between the polarizer and the protection film;

pressing a laminate of the process film/the polarizer/the protection film by disposing a pair of pressing units on each surface of each of the process film and the protection film;

stripping the process film, wherein stripping force between the polarizer and the process film is 1.0 N or less, and wherein surface roughness (Ra) of the process film is 0.5 nm to 60 nm.

2. The method for manufacturing a single-faced thin polarizing plate of claim 1, further comprising:

forming a protection layer on a surface from which the process film is stripped after the stripping of the process film.

3. The method for manufacturing a single-faced thin polarizing plate of claim 2, wherein the protection layer is formed by using a radical-curable composition or a cation-curable composition.

4. The method for manufacturing a single-faced thin polarizing plate of claim 2, wherein a modulus of the protection layer is 500 MPa to 6000 MPa.

5. The method for manufacturing a single-faced thin polarizing plate of claim 2, wherein a thickness of the protection layer is 0.5 µm to 10 µm.

6. The method for manufacturing a single-faced thin polarizing plate of claim 1, wherein the pressing is performed under a pressure of 0.5 MPa to 6 MPa.

7. The method for manufacturing a single-faced thin polarizing plate of claim 1, wherein a thickness of the process film is 20 µm to 100 µm.

8. The method for manufacturing a single-faced thin polarizing plate of claim 1, wherein a width of the process film is larger than a width of the polarizer.

9. The method for manufacturing a single-faced thin polarizing plate of claim 1, wherein the process film includes one kind or more selected from the group consisting of a polyethylene terephthalate film, a polyethylene film, a polycarbonate film, a triacetylcellulose film, a cycloolefin polymer film, and an acryl film.

10. The method for manufacturing a single-faced thin polarizing plate of claim 1, wherein the protection film includes one kind or more selected from the group consisting of a polyethylene terephthalate film, a polyethylene film, a polycarbonate film, a triacetylcellulose film, a cycloolefin polymer film, and an acryl film.

11. The method for manufacturing a single-faced thin polarizing plate of claim 1, wherein the polarizer is subjected to wet stretching or dry stretching.

12. The method for manufacturing a single-faced thin polarizing plate of claim 11, wherein the wet stretching or the dry stretching is performed at a stretching magnification of 4 times or more.

13. The method for manufacturing a single-faced thin polarizing plate of claim 1, wherein a thickness of the single-faced thin polarizing plate is 30 µm to 140 µm.

* * * * *